United States Patent [19]

Harper

[11] 4,369,150
[45] Jan. 18, 1983

[54] LIQUID WALL FLOW COLLECTOR FOR CHEMICAL PROCESS TOWER

[75] Inventor: Stephen M. Harper, Lake Jackson, Tex.

[73] Assignee: The Dow Chemical Company

[21] Appl. No.: 322,504

[22] Filed: Nov. 18, 1981

[51] Int. Cl.³ .............................................. B01F 3/04
[52] U.S. Cl. ...................................................... 261/97
[58] Field of Search ........................................... 261/97

[56] References Cited

U.S. PATENT DOCUMENTS

| | | | |
|---|---|---|---|
| 3,099,697 | 7/1963 | Lerman et al. | 261/97 |
| 3,243,171 | 3/1966 | Eckert | 261/97 |
| 3,290,024 | 12/1966 | Huber | 261/97 |
| 3,448,038 | 6/1969 | Pall et al. | 261/97 |
| 3,598,541 | 8/1971 | Hennemuth et al. | 261/97 |
| 3,916,021 | 10/1975 | Hajek et al. | 261/97 |

FOREIGN PATENT DOCUMENTS

| | | | |
|---|---|---|---|
| 1086215 | 8/1960 | Fed. Rep. of Germany | 261/97 |
| 1215606 | 12/1970 | United Kingdom | 261/97 |

OTHER PUBLICATIONS

Norton Catalog, p. 41, Bulletin TA 80R, Dec. 1976, The Norton Co.

Glitsch, Inc. Catalog, p. 18, Bulletin No. 217, Second Ed., Glitsch, Inc.

Primary Examiner—Tim R. Miles

[57] ABSTRACT

In a cylindrical shaped chemical process tower wherein it is desired to collect and/or redirect the flow of liquid flowing down the tower's internal wall surface, a wall wiper which requires no bolting or welding to the tower and which affords a liquid seal with the tower wall, said wall wiper comprising flexible annular segments of slightly less radius of curvature than the tower, said segments being in near end to end relationship with each other so as to take the shape of a horizontal segmented ring with small gaps between the segments. The flexible segments are spread apart in the tower by spreading means connecting the ends of the adjacent flexible segments until these segments sufficiently conform to the tower wall to form both leak-proof seals and friction joints thereinbetween. Liquid flow along the tower wall in the gaps between the segments is prevented by bridging lips attached to the segments and spanning the gaps while also forming a leak-proof seal against the tower wall.

11 Claims, 8 Drawing Figures

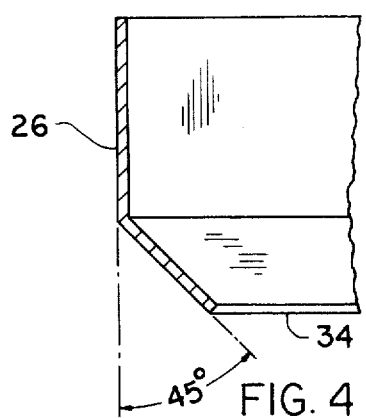
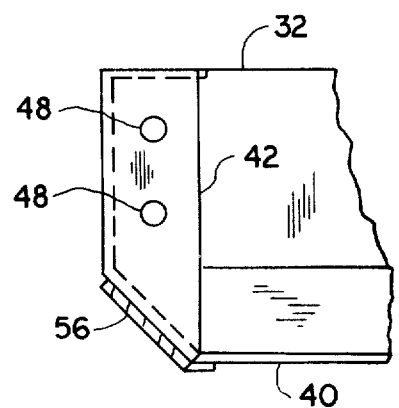
FIG. 4  FIG. 5
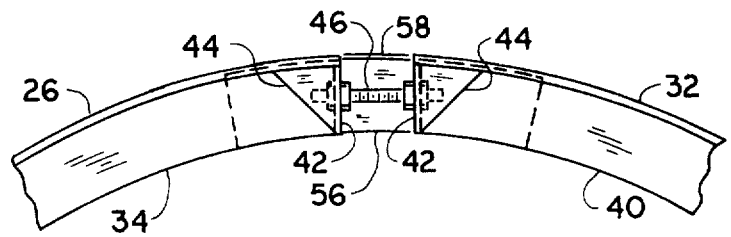
FIG. 7
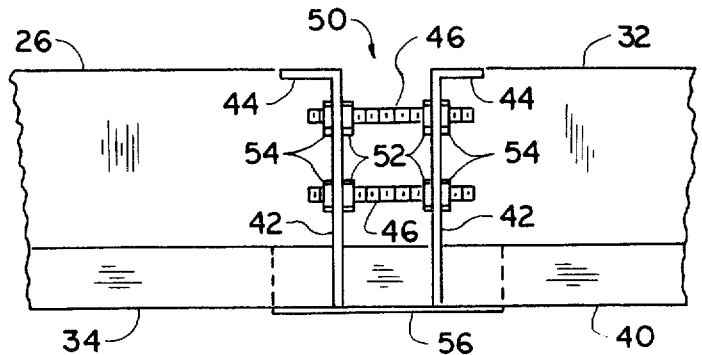
FIG. 6

LIQUID WALL FLOW COLLECTOR FOR CHEMICAL PROCESS TOWER

BACKGROUND OF THE INVENTION

This invention relates to a device used in chemical process towers or columns to collect liquid trickling down the interior wall of the tower and then orient it away from the wall into some type of tower internal. Examples of such towers or columns are distillation towers, absorption towers, and extraction towers. Examples of such tower internals are liquid distributors, liquid redistributors, and liquid side draw collectors. Most chemical process columns and towers are cylindrical in shape and stand in an upright position, or more precisely most of these towers are designed to be vertically oriented, right circular cylindrical sections.

Often within such towers there is liquid flowing downwardly, and it is usually highly desireable to have this liquid distributed in a uniform pattern across a given imaginary horizontal cross-section of the tower. However, it is known among those skilled in the art that the downflowing liquid migrates toward the internal side walls of the tower to which it adheres and continues its downward flow. Thus the further you go down a tower in which this migration is unchecked, the more liquid there is flowing downwardly along the tower walls and the less uniform distribution of this liquid across an imaginary horizontal tower cross-section. This problem has been found to be particularly acute in instances where the downward liquid flow is at very low flow-rates; e.g., less than about 1.0 gallon per minute per square foot of tower cross-section, taken across an imaginary horizontal cross-sectional plane of the tower.

The prior art teaches many tower internals to redirect and/or collect this liquid flowing downwardly along the internal tower wall, but they all suffer from the same fundamental problem. This problem is that although the towers are specified as being cylindrical with a given internal diameter, and accordingly the internals designed to fit them are specified to have the same cylindrical diameter, these towers and internals are never a geometrical true cylinder. In their construction, aberrations, albeit small, appear in these towers which prevent them from being perfectly round. This too has long been known by those working with such towers as is manifest by the several means and methods they have gone about correcting these aberrations.

These correcting means have centered principally around two approaches, one being to weld or bolt the tower internals in place and then running a weld bead between the outer periphery of the internal and the inner periphery of the tower wall to form a leak-proof seal therein between. Of course, unwelding such an internal from the tower wall is a very tedious task for those who have to crawl into the tower to make some sort of tower modification requiring tower internal modification.

The other principal approach used to try to provide leak proof seals has been to provide gasketing materials between the out-of-round tower internal and tower wall. But even these gasketing protection procedures allow some leakage down the tower wall which is especially noticeable at very low liquid flowrates when such flows are desired to be maintained at a uniform distribution across the towers, or when the liquid is desired to be removed from the tower at some level within the tower.

These shortcomings and others have been overcome by the present invention. This invention is a liquid wall flow collector which is easy to install and easy to remove from the tower for maintenance of the internal into which it is directing the wall liquid. It provides an excellent seal to the tower wall whether the interior of the tower wall is perfectly round or not. It provides its own friction joint against the tower wall to provide its own support within the tower without requiring the presence of bolting or welding to the tower wall. Its position within the tower relative to the tower internal can be easily adjusted.

These advantages and others can be observed in the further description of the invention.

SUMMARY OF THE INVENTION

The present invention is an adjustable liquid wall flow collector for use in a chemical process tower wherein among other fluid flow there exists a liquid which is adhering to and flowing downwardly along the interior of the tower walls, of which it is desired to collect or redirect away from the tower wall toward the interior of the tower. More particularly the present invention is designed for use in towers which has a vertical wall which is a substantially right circular cylinder in shape, or is so cylindrically shaped at the level in the tower where the liquid wall flow collector is installed.

The adjustable liquid wall flow collector is comprised of: (1) a plurality of flexible, adjacent, near abutting annular segments adjustably connected together at their ends in such a fashion so to form a horizontally-oriented, segmented ring; (2) means for connecting said annular segments at their adjacent ends as well as being means for spreading them apart sufficiently against the tower wall so as to conform to the shape of the tower to make a liquid tight seal therewith as well as a supporting friction joint; and (3) a lip sealably and permanently attached to each of said annular segments, with each lip extending radially inward from the tower wall to direct liquid away from the tower wall. Provision to achieve even more excellent removal of the liquid from the tower wall is made by attaching a bridging lip section to the end of one of the two adjacent annular sections in a manner such that the bridging lip section extends across the gap existing between the sections far enough to underlap or overlap a sufficient part of the adjacent lip while contacting the tower wall in order to prevent liquid from flowing down the tower walls in the gap between the adjacent, but non-abutting, annular segments.

BRIEF DESCRIPTION OF THE DRAWINGS

A better appreciation of the invention may be had by reference to the drawings wherein:

FIG. 4 is a fragmentary sectional side view of the annular segment and lip of the wall flow liquid collector as seen along the line 4—4 in FIG. 3.

FIG. 5 is a fragmentary sectional side view of the wall flow liquid collector taken along line 5—5 in FIG. 4 but not showing the bolts and nuts.

FIG. 6 is a fragmentary elevation of the wall flow liquid collector as seen along arc line 6—6 in FIG. 2 showing two near abutting annular segments with their respective lips, the adjusting means connecting these two annular segments and the lip bridging section bridging the gap between the adjacent annular segments and their respective drainage lips, but not showing the tower.

FIG. 7 is a plan or top of the fragmentary portion of the wall flow liquid collector shown in FIG. 6.

DETAILED DESCRIPTION OF THE PREFERRED EMBODIMENT

Figure 1:
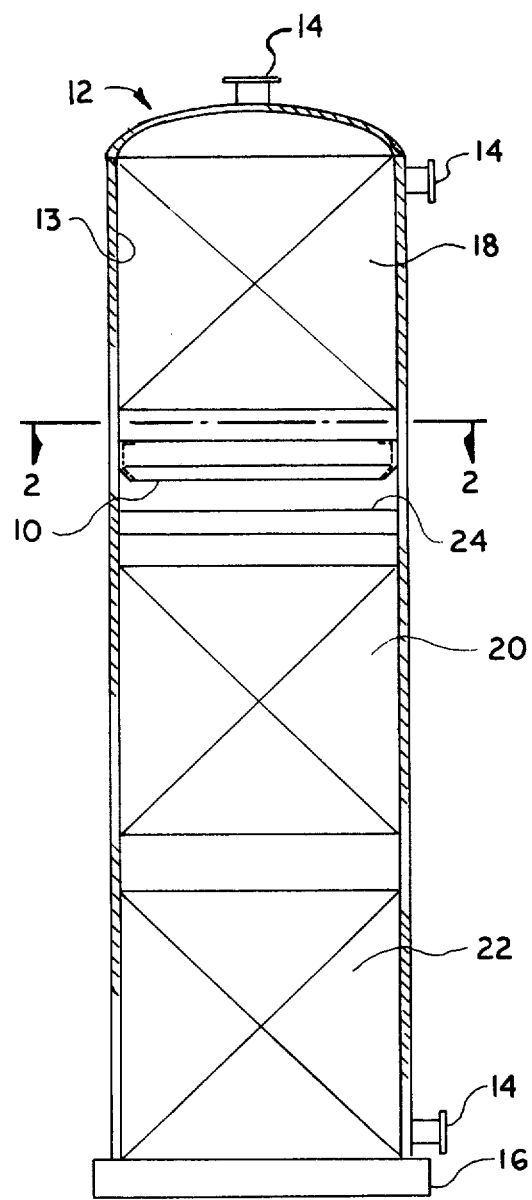
FIG. 1 is an elevation in section of a chemical process tower containing a liquid wall flow collector.

In FIGS. 1-8 there appear graphic illustrations of different features of the preferred embodiment of this invention. Referring to FIG. 1, a liquid wall flow collector 10 is shown installed in a typical chemical process tower 12. Tower 12 is a typical right circular cylinder shaped tower used for many varied purposes in industry. Tower 12 is shown with representative inlet and outlet ducts 14 which are typical of ducts used with such towers. Tower 12 is shown resting on tower base 16. Inside tower 12 are shown three regions 18, 20 and 22 as being representative of different regions in such towers.

Of immediate concern to the present invention are regions 18 and 20 located above and below collector 10, respectively. For purposes of illustration it is convenient to let regions 18 and 20 represent a tower section in which reflux distillation is being carried out amongst a bed of column packing wherein liquid is flowing downwardly while gases are rising upwardly, and wherein it is desired to maintain as uniform a distribution of the liquid in the vapor as possible with respect to any given height in the tower 12.

It is well known that such downwardly flowing liquid tends to migrate toward and accumulate on the interior of the tower wall as it flows downwardly through the tower packing. The liquid which reaches the tower wall tends to adhere thereto in increasing amounts as it flows down the tower. Of course, this liquid accumulation may not be significant when large volumes of liquid flow are involved, but when small liquid flow rates are involved (less than about 1.0 gallons per minute per tower horizontal square foot), this accumulation is known to significantly upset the desired performance of the tower by causing a significant decrease in the amount of liquid within the tower packing beds wherein intimate contact with the rising gases is desired.

To rectify this particular problem of liquid distribution, many types of liquid redistributors have been developed such as redistributor 24 shown in FIG. 1. But whether it be with redistributors or other tower internals, the problem of clearing the wall of liquid in an easy manner has persisted.

Even though specified as being a cylinder with a specified internal diameter, virtually no commercial tower is ever built which is a perfect cylinder. Rather they have slightly irregular shapes which are not known are compensated for by the manufacturers of tower internals including so called tower wall wipers whose purpose is to divert liquid flowing down the wall away from the wall. These wall wiper internals, as stated above, are often sealed against the tower wall with welding which is indeed difficult to undo, or are attempted to be sealed with gasketing between the element and tower walls. The internals and wall wipers using gaskets are usually supported by bolts or spot welds. But the gaskets leak and the tower internal still need be supported by bolts or welds. The collector or wall wiper 10 of the present invention not only provides superior sealing by employing flexible materials which are forced to conform to the shape of the tower wall, but it also simultaneously provides a support means for itself which further allows collector 10 to be very easily installed and removed without the necessity of welding and/or bolting it to tower 12.

A more detailed view of collector 10 can be obtained by reference to FIGS. 2-8 wherein the discrete elements of collector 10 can be observed.

Figure 2:
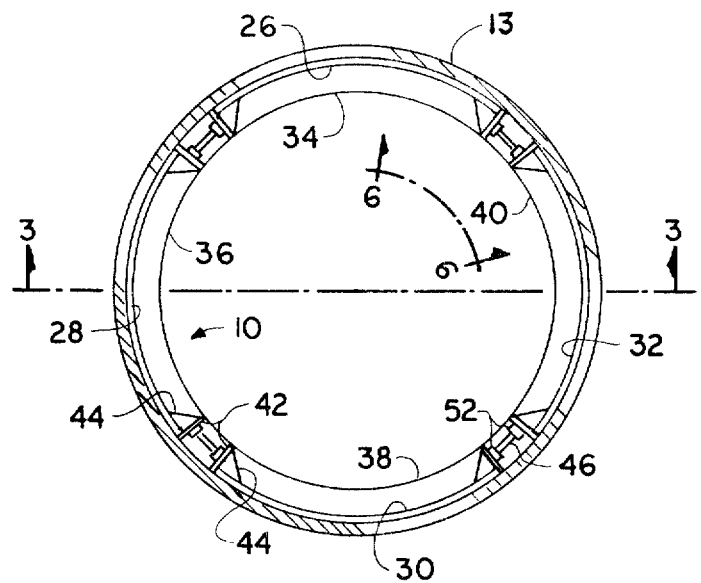
FIG. 2 is a top view in more detail of the wall flow liquid collector as seen along line 2—2 of FIG. 1.
Figure 3:
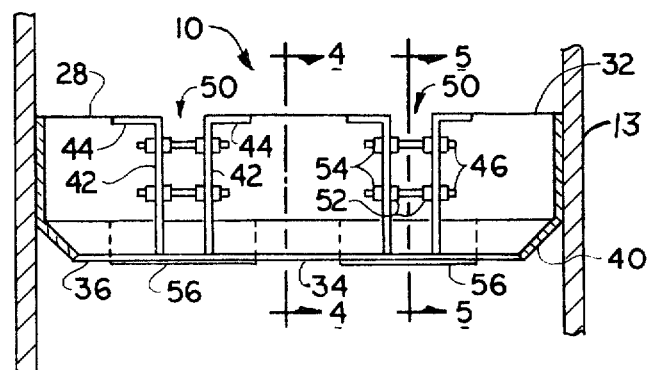
FIG. 3 is a sectional side view of the wall flow liquid collector shown in FIGS. 1 and 2 as seen along line 3—3 in FIG. 2.
Figure 8:
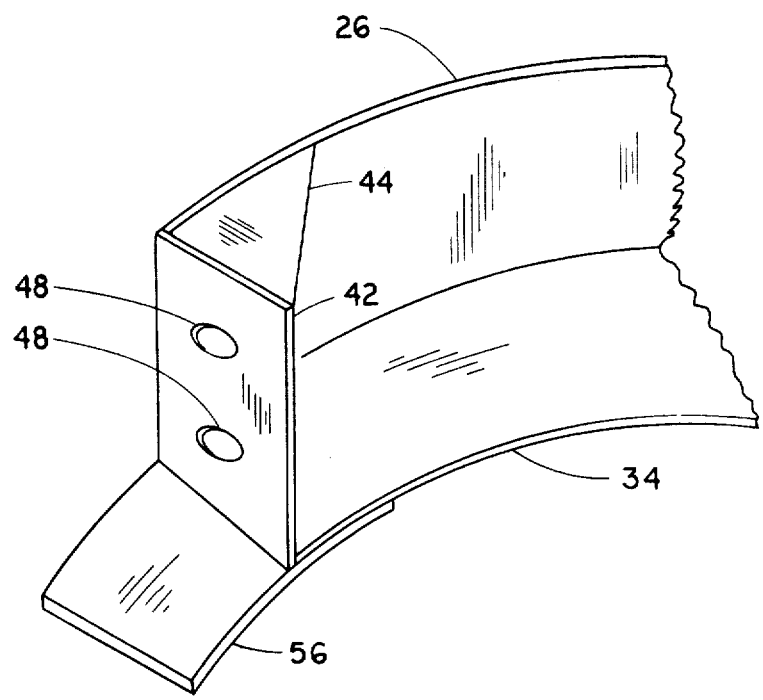
FIG. 8 is an isometric fragmentary view of part of the wall flow liquid collector.

Four annular segments 26, 28, 30 and 32 are shown connected together in the form of a horizontally-oriented segmented ring with gaps located between the segments' near abutting ends. (FIG. 2).

Welded to the bottom of each annular segment 26, 28, 30 and 32 is a corresponding lip 34, 36, 38 and 40. Each lip 34, 36, 38, 40 extends radially inward at a 45° angle from the downward vertical position. Each lip 34, 36, 38, 40 is the same arc length as its corresponding annular segment 26, 28, 30, 32, and is attached to its annular segment so that its two ends are coterminous with the ends of their respective annular segment. Each annular segment 26, 28, 30, 32 and its respective lip 34, 36, 38, 40 have a radius of curvature which is slightly less than the radius of curvature of the average radius of the inner periphery of the tower wall 13.

The annular segments 26, 28, 30 and 32 and their respective lips 34, 36, 38 and 40 are made of a material which is sufficiently rigid to substantially maintain its design structure within tower 12, but yet it is sufficiently flexible with respect to tower wall 13 to conform to the out-of-round shape of tower wall 13. For example if tower wall 13 is made of ¼ inch 304 stainless steel, and if the annular segments and lips are made of 304 stainless steel sheets having a 10 gauge thickness, these sheets are considered flexible with respect to the tower wall because they can be readily forced to conform to the shape of the tower wall sufficiently to form a leak-proof seal between themselves and the tower wall.

The way these annular segments are flexed apart, or forced, to conform to the tower wall leads to a discussion of the ring diameter adjusting means mentioned above. At the end of each annular segment 26, 28, 30, 32 and at the end of each annular lip segment 34, 36, 38, 40, there is welded a vertical bolt attachment plate 42 and a horizontal reinforcing plate 44. Bolts 46 pass through holes 48 in bolt attachment plates 42. As can be better seen in FIGS. 3, 6 and 8, there exists a gap 50 between the near abutting ends of adjacent annular segments 26, 28, 30, 32. On bolts 46 are located spreading nuts 52 and locking nuts 54 (see FIG. 6).

When annular segments 26, 28, 30 and 32 are assembled within tower 12, they are spread apart by screwing spreading nuts 52 toward the ends of bolts 46 whereby they push bolt plates 42 apart. These nuts 52 are screwed outwardly until flexible annular segments 26, 28, 30, 32 are forced to conform to the shape of the internal periphery of tower wall 13 in a surface-to-surface, leak-proof seal as well as a friction joint capable of supporting collector 10 within tower 12. Lock-nuts 54 are added to prevent the spreading nuts 52 from backing off.

This, however, only provides for preventing liquid flow down the tower where there are no gaps 50. To complete the seal around the complete internal periphery of the tower wall 13, a bridging lip section 56 must be provided to bridge and seal each gap 50. In FIGS. 2, 3, 5, 6, 7, 8, these bridging lip sections 56 are shown. Here lip sections 56 are a stainless steel plate made as an annular arc of the same radius of curvature and width as lips 34, 36, 38, 40. In fact lip bridges 56 are in a way extensions of lips 34, 36, 38, 40, except that they are not in the same plane as arc annular lips 34, 36, 38, 40 so that they, the bridging lips 56, can slide past the annular lips 34, 36, 38, 40 when collector 10 is installed in tower 12.

To illustrate this, refer to FIGS. 6 and 7 where a bridging lip 56 is seen bridging the gap 50 existing between annular segments 26 and 32, and their respective lips, 34 and 40. It matters not to which of the two lips 34 and 40, bridging lip 56 is fixedly attached, but it must be fixedly attached to one of this pair of near abutting lips 34 and 40 and not attached to the other one so that bridging lip 56 can slide past one of these lips 34 and 40 when the annular sections 26 and 32 with their lips 34 and 40 are spread apart in tower 12 by the outward screwing of turning nuts 52. Hence, for purposes of discussion, let bridging lip 56 be welded to the bottom of lip 34 in a manner so that its outer edge 58 lies in the same circular circumference as do the outer rims of annular segments 26 and 32. Thus a ring of uniform outside diameter composed of lips 58 and annular segments 26, 28, 30, 32. When annular sections 26, 28, 30, 32 are spread apart, they along with the outer rims 58 of bridging lips 56, form a leak-proof seal with the internal periphery of tower wall 13.

Thus, in operation, liquid flowing down tower wall 13 above collector 10 is stopped from further downward flow by either annular segments 26, 28, 30 and 32 or bridging lips 56, and is then directed into redistributor 24 (FIG. 1) by annular lips 34, 36, 38, 40 and bridging lips 56.

I claim:

1. An easily installable and removable liquid wall flow collector for use in a chemical process tower, wherein said tower liquid adheres to and flows down the inside of the tower's side walls but wherein it is desired to direct this liquid away from the tower side walls toward the center of the tower at least at some level in the tower, the interior of said tower's side walls at this level having a horizontal cross-section which is substantially circular in shape; said liquid wall flow collector being comprised of:

A. a plurality of annular segments adjustably connected together at their ends in such a fashion so as to form a horizontally-oriented segmented ring with small gaps existing between the ends of near abutting, adjacent annular segments, said ring being located within said tower at the tower level where it is desired to direct liquid flowing down the tower wall away from said tower wall, said annular segments being flexible with respect to said tower wall, said annular segments having a natural radius of curvature which is less than the average radius of curvature of the interior tower wall surface at that tower level where the wall flow liquid is to be directed away from the wall so that the ring may be easily assembled within the tower with said attaching means being such that the segments may be disconnected from each other for ease of passage in and out of said tower;

B. a ring diameter adjusting means connecting two adjacent flexible annular segments for spreading said flexible annular segments apart to expand the diameter of the ring formed by these segments sufficiently so that these segments are so pressed against the tower wall's internal peripherial surface at the tower level where the wall flow liquid is desired to be diverted until the annular segments sufficiently conform to the tower wall's surface thereat to form a leak-proof seal between said segments and said tower wall's surface and also to form a friction joint between said segments and said tower wall surface which is capable of supporting the liquid wall flow collector in the tower; and C. a lip sealably and permanently attached to each of said annular segments, each lip extending radially inwardly from its corresponding annular segment at an acute angle from the downward vertical direction for a sufficient distance to divert liquid flowing down the tower wall to the desired area within the tower.

2. The liquid wall flow collector of claim 1 wherein the annular segments are vertically oriented sheets of metal which have the shape of a right-circular cylindrical segment.

3. The liquid wall flow collector of claim 1 wherein the annular segments have a natural radius of curvature which is no less than about 75% of the average diameter of the interior of the tower at the tower level where the liquid wall flow collector is to be installed.

4. The liquid wall flow collector of claim 1 wherein the natural, unstressed radius of curvature of the curved annular segments of element (A) is no less than about 90% of the average radius of curvature of the tower wall surface interior.

5. The liquid wall flow collector of claim 1 wherein the natural, unstressed radius of curvature of the curved annular segments of element (A) is no less than about 94% of the average radius of curvature of the interior tower wall surface interior.

6. The liquid wall flow collector of claim 1 wherein there exists a ring diameter adjusting means connecting the adjacent ends of each near abutting annular segment of the horizontal ring.

7. The liquid wall flow collector of claim 1 wherein the ring diameter adjusting means can not only spread the annular segments apart, but can also pull together the annular segments to loosen said segments from said tower wall in order to easily remove the wall flow collector from the tower.

8. The liquid wall flow collector of claim 7 wherein there exists such a ring diameter adjusting means connecting the adjacent ends of each annular segments of the horizontal ring.

9. The liquid wall flow collector of claim 1 wherein the lip of element (C) extends from each annular segment at the same acute angle from the downward vertical direction, with each lip being attached to its corresponding annular segment at the same height so that the several lips lie in the surface of a frustrum of an imaginary inverted right circular cone whose base passes through each of said annular segments at that same horizontal level at which said lips are attached to said annular segments.

10. The adjustable liquid wall flow collector of claims 1, 2, 3, 4, 5, 6, 7, 8 or 9 which further comprises a plurality of bridging lip sections for preventing leakage of liquid down the tower wall through gaps existing between said annular sections when they are expanded apart in the tower, each of said bridging lip sections being sealably and fixedly attached to the end of one of each pair of the ends of annular sections in near abuttment to each other within said segmented ring, said bridging lip section extending far enough from its annular section to either overlap or underlap the near abutting annular section and lip while also contacting the tower wall in the gaps between the near abutting pairs of annular sections and extending radially inward from the tower wall sufficiently to direct the liquid flow to a desired area within the tower.

11. The adjustable wall flow collector of claims 1 or 2 wherein the respective lip of each annular segment is attached to the bottom of said segment, each following the curved contour of said segment, each lip being the same arc length as said annular segment; and wherein there is a ring diameter adjusting means connecting the adjoining ends of each pair of near abutting annular segments of the ring which adjusting means can not only spread apart the annular segments until they form a liquid-tight seal against the tower wall and a friction joint with the tower wall, but they can also pull the annular segments together to break the friction joint as well as easily become disconnected from the annular segments so said segments can be easily removed from said tower; and which further comprises a bridging lip section fixedly attached to the bottom of the lip of one of the two near abutting ends of each pair of adjacent annular segment ends in such a fashion so as to extend across the gap existing between said pairs of adjacent annular segments and under the lip to which it is not attached and in such fashion so that it maintains a continuous sealing contact with the tower wall in the gap between the annular segments.

* * * * *